United States Patent [19]
Sugimori

[11] 3,783,762
[45] Jan. 8, 1974

[54] MOTOR DRIVE FOR A CAMERA
[75] Inventor: Shiro Sugimori, Tokyo, Japan
[73] Assignee: Nippon Kagaku K.K., Tokyo, Japan
[22] Filed: July 13, 1972
[21] Appl. No.: 271,628

[52] U.S. Cl.............. 95/31 EL, 95/31 R, 352/124, 242/71.6
[51] Int. Cl.... G03b 19/04, G03b 1/60, G03b 17/36
[58] Field of Search.................. 95/31 EL, 31 R; 352/124; 242/71.5, 71.6

[56] References Cited
UNITED STATES PATENTS
| 3,603,523 | 9/1971 | Umeda | 242/71.6 |
| 3,598,033 | 8/1971 | Sasaki | 95/31 EL |
| 3,559,911 | 2/1971 | Katsuyama | 242/71.5 |

Primary Examiner—Robert P. Greiner
Attorney—Fitzpatrick, Cella, Harper & Scinto

[57] ABSTRACT

A motor drive for a camera has a motor drive system which comprises a motor, a circuit for driving the motor including two switches, means for blocking film transportation in a rewinding direction, a first manually operable member connected to the rewind blocking means and movable between first and second positions, and a second manually operable member for engagement with a supply spool and connected to the motor and movable between first and second positions. One of the two switches in the circuit may be opened and closed in response to movement of the first operable member to its first and second positions, respectively. In the second position of the first operable member, the rewind blocking means is rendered ineffective. The other switch is opened and closed in response to movement of the second operable member to its first and second positions, respectively. In its second position, the second operable member is engageable with the supply spool so that the spool may be rotated by the drive from the motor to take up the film thereon.

7 Claims, 6 Drawing Figures

PATENTED JAN 8 1974 3,783,762

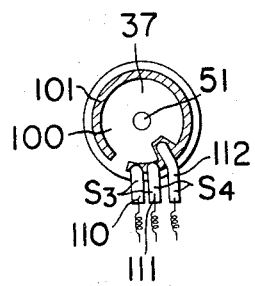
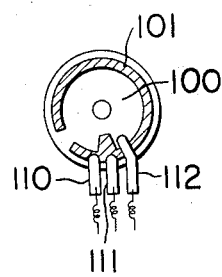
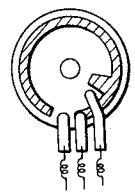
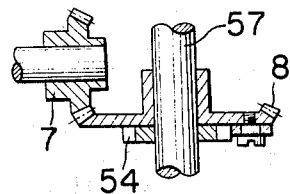
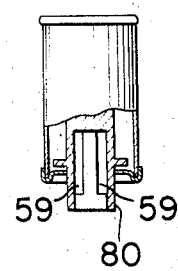
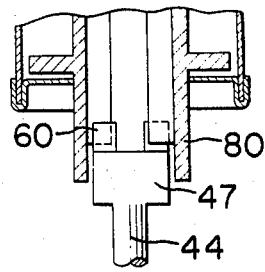
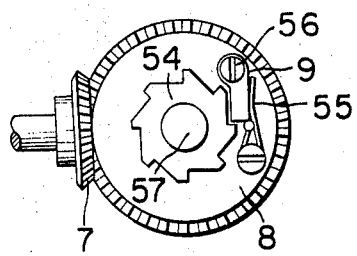
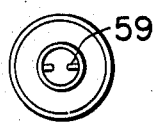
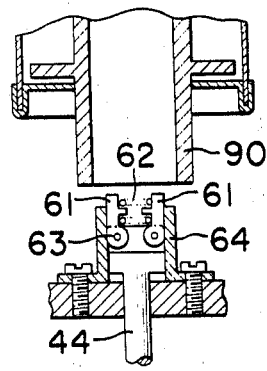
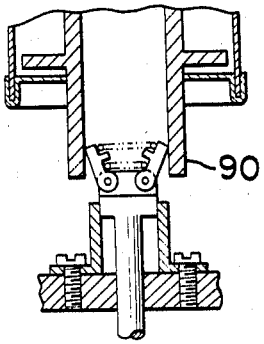

3,783,762

MOTOR DRIVE FOR A CAMERA

BACKGROUND OF THE INVENTION

1. Field of the Invention

This invention relates to a motor drive for a camera, and more particularly, to a motor drive system therein whereby film may be safely and positively rewound by a drive motor.

2. Description of the Prior Art

In a prior film rewind system, an operating lever is actuated to rewind a film and the film rewinding operation can be effected at any desired time. This system has been disadvantageous in that any inadvertent contact with the operating level might cause the film to be rewound when rewinding is not desired.

SUMMARY OF THE INVENTION

I have conceived apparatus of the class described by which I am able to eliminate the above-described disadvantage which has existed in the drive system of the prior art.

Thus, the present invention provides a motor-driven camera comprising a circuit for driving a motor in the camera, the circuit including two switches. Means are provided for blocking transportation of a film in a rewinding direction. A first manually operable member is connected to the rewind blocking means and is movable between a first position in which the rewind blocking means is effective, and a second position in which it prevents the blocking means from interfering with film transportation in the rewind direction. One of the two switches in the circuit is movable in response to the movement of the first operable member and is open in the first position of same, and is closed in the second position thereof. A second manually operable member engages a film supply spool to rotate the spool. The second operable member is connected to the motor and is movable between first and second positions. When it is in its second position, the second operable member is engaged with the supply spool to rotate it by the drive from the motor so as to take up the film on the spool. The other of the two switches is movable in response to the movement of the second operable member and is open in the first position of the second operable member and closed in the second position of such member.

According to a feature of the present invention, the second manually operable member may comprise a rotary shaft having at one end thereof coupling means engageable with the supply tool. The coupling means is engaged with the supply spool in the second position of the rotary shaft thereby to transmit the rotation of the rotary shaft to the supply spool. A manually operable lever is connected to the rotary shaft to move the shaft between first and second positions; and clutch means are provided between the rotary shaft and the motor, and are adapted to connect them together only when the rotary shaft has been moved to its second position by the manually operable lever.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein:

FIGS. 3(1), (2) and (3) illustrate the open and closed positions of the plate spring contacts of the film counter portion in the camera;

FIG. 4(1) and (2) illustrate a pawl clutch assembly in the system of FIG. 1;

FIGS. 5(1), (2) and (3) illustrate the engagement between a film magazine spool having projections formed in the lower portion thereof and a motor-driven rewind shaft; and FIGS. 6(1) and (2) illustrate the engagement between a film magazine spool having no such projections and a motor-driven rewind shaft.

DESCRIPTION OF THE PREFERRED EMBODIMENTS

Figure 1:
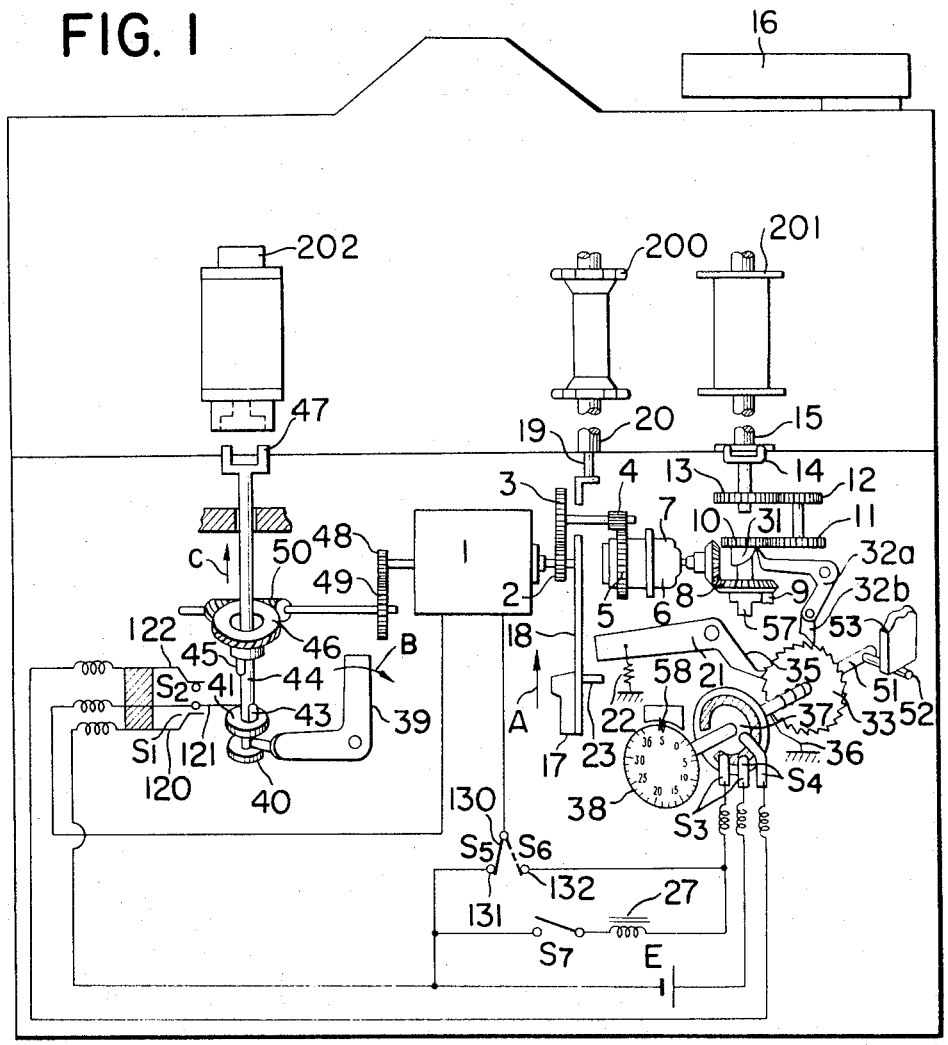
FIG. 1 is a schematic illustration of the mechanism and electric circuit of the motor drive system according to the present invention.

Referring to FIG. 1, a drive source shown as an electric motor 1 has a gear 2 connected thereto. The gear 2, in turn, is connected via a gear train 3, 4, 5 to a clutch 6, which may be retracted leftwardly out of engagement, as viewed in the figure, when a torque exceeding a predetermined value is imparted thereto. As shown in FIGS. 1 and 4, a bevel gear 7, connected to the clutch 6, engages a bevel gear 8 connected to a shaft 57.

Referring particularly to FIG. 4, the bevel gear 8 is rotatably supported on the shaft 57 which carries thereon an integrally formed ratchet wheel 54. A pawl 9 is secured to the bevel gear 8 by means of a stepped screw 56; and a spring 55 is provided to bias the pawl 9 into engagement with the ratchet wheel 54. Thus, the clockwise rotation of the bevel gear 8 may be transmitted via the pawl 9 and ratchet wheel 54 to the shaft 57.

Turning back to FIG. 1, a gear 10 is integrally formed with the shaft 57 and connected via a gear train 11, 12 and 13 to a coupling 14 which is mounted on a shaft common with the gear 13. The coupling 14 is engaged with a camera's coupling 15 connected to a take-up spool 201.

A lever 32a and a lever 32b, formed thereon togeether, constitute a well-known arrangement for rotating intermittently the ratchet wheel 33 in clockwise direction. When these levers 32a and 32b are stationary, the lever 32b lies out of the circular path followed by the toothed periphery of the ratchet wheel 33. A shaft 51 extends through and is secured to the ratchet wheel 33, and a printed plate 37 is securely mounted on the shaft 51. A scale plate 38 is securely mounted at one end of the shaft 51 and cooperates with a fixed index mark 58 to indicate the length or number of frames of unexposed film. A spiral spring 36 is wound on the shaft 51 normally to impart a counter-clockwise rotational torque to the shaft 51. At the other end of the shaft 51 there is fixed a pin 52 perpendicularly thereto, which pin 52 cooperates with a stop member 53 to block the tendency of the shaft 51 to rotate due to the rotational torque imparted thereto by the spring 36. The relative positions of the scale plate 38 and the stop member 53 are such that a mark "S" on the scale plate 38 is registered with the index mark 58 when the pin 52 bears against the stop member 53. In this position, the mark "S" indicates the fact that a film roll has been duly loaded in the camera.

Switches S3 and S4 are seen adjacent to the printed plate 37 and FIG. 3 clearly shows the relation between the printed plate 37 and the switches S3, S4. As shown, an electrically insulating portion 100 and an electrically conductive portion 101 are provided on the printed plate 37. The switch S3 comprises conductors 110, 111 and the switch S4 comprises conductors 111, 112. When the scale plate 38 is positioned with the mark "S" thereon registered with the index mark, the switches S3 and S4 are closed with the conductors 110, 111 and 112 being all in contact with the conductive portion 101 of the plate 37, as shown in FIG. 3(1). As the ratchet wheel 33 is advanced over one tooth by the levers 32a, 32b, the printed plate 37 assumes the position shown in FIG. 3(2), in which the switch S3 remains closed while the switch S4 is open with the conductor 112 in contact with the insulating portion 100. The closed position of the switch S3 and the open position of the switch S4 will be maintained irrespective of further rotation of the ratchet wheel 33, but when the division "O" on the scale plate 38 is registered with the index mark 58, i.e., when the length of the loaded film reaches the terminal end thereof, the printed plate 37 assumes the position, as shown in FIG. 3(3), in which both switches S3 and S4 are open with the conductors 110 and 112 in contact with the insulating portion 100 of the printed plate.

Referring again to FIG. 1, a member 17 manually operable from outside the camera has a slidable rod 18 securely attached thereto, which rod 18, in turn, has a member 19 secured thereto and engaged with a rewind release button 20 of the camera. A sprocket 200 is rotatable only in the film winding direction during a film winding operation, but it is also rotatable in the opposite direction upon depression of the rewind release button 20, although the arrangement therefore is not shown. The member 18 has a projection 23 secured thereto for rotating a lever 21, one end 35 of which is engaged with the ratchet wheel 33 to block the tendency of the ratchet wheel to be rotated counterclockwise by the force of the spring 36. A spring 22 is provided to overcome the rotation force imparted from the ratchet wheel 33 to the lever 21.

A gear 48 is connected to the motor 1 and engages a gear 49, which is rotatably mounted on a shaft having a worm 50 mounted integrally thereon. The worm 50 is engaged by a worm wheel 46 having a pawl 45 formed integrally therewith. A slidable rewind shaft 44 vertically extends through the worm wheel 46 at the center thereof, and a member 40, fixed to an exteriorly operable lever 39, engages a member 41 integral with the rewind shaft 44 thereby to impart vertical movement to that shaft. A pawl 43 is integrally formed with the member 41 and engageable with the pawl 45 to transmit the rotation of the worm wheel 46 to the shaft 44. A coupling 47 is attached to the upper end of the rewind shaft 44 and is engageable with a supply spool 202.

Switches S1 and S2 are provided for conductors 120, 121 and 121, 122, respectively. The conductor 121 is movable in response to the movement of the member 41.

Fruther provided is a switch S5 for movable conductor 130 and a contact 131, and a switch S6 for movable conductor 130 and a contact 132. The conductor 130 is movable in response to the energization and deenergization of an electromagnet 27, in such a manner that the conductor 130 is connected with the contact 132 upon energization of the magnet 27 and connected with the contact 131 upon deenergization of the magnet 27. A push button switch S7, for energizing the motor drive system, and an electric source E are further provided, as shown.

Figure 2:
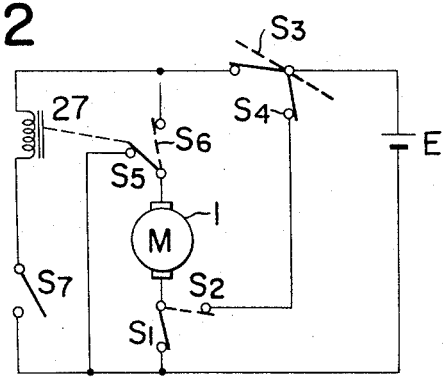
FIG. 2 is a diagram illustrating the electric circuit in particular.

The motor drive system of the described construction will now be described with respect to the operation thereof. Although this drive system is identical with the conventional one in respect of the film winding and shutter release operations, a portion of the system pertaining to the film rewinding operation will be described briefly. Upon energization of the motor 1, the torque thereof is transmitted via gears 2 – 5, winding torque detection clutch 6, bevel gears 7 – 8, a pawl clutch comprising pawl 9 and ratchet wheel 54, and gears 10 –13 to the wind coupling 14 thereby to rotate the camera's wind shaft 15 in the winding-up direction. The rotation of the shaft 57 is not transmitted to the bevel gear 7 even when the wind-up operation is manually effected by the use of the camera's wind lever 16 via the pawl clutch comprising pawl 9 and ratchet 54. As the film is advanced by one frame during the picture-taking process, the cam 31 is rotated to cause the aforesaid levers 32a, 32b to advance the ratchet wheel 33 by one tooth in the clockwise direction. This rotation of the ratchet wheel 33 causes the printed plate 37 and scale plate 38 to effect a corresponding angular rotation because these two plates are securely mounted on the common shaft 51 with the ratchet wheel 33, and thus the amount of film advanced is indicated by a division of the scale plate 38 relative to the index mark 58. A rotational torque is applied to the shaft 51 by the spiral spring 36, and the shaft is thus maintained in a biased position by the check pawl 35. When the scale plate 38 assumes its "O" position, upon completion of the picture-taking operation, the switch S3 is opened (FIG. 3(3)) to open the circuit from the electrical source E to the motor 1, so that the motor 1 is not energized even if the push button switch S7 is closed (see FIG. 2). As the picture taking operation is completed, the push button switch $S_7$ is opened. In operation of the film rewinding procedure, when the member 17 is manually moved in the direction indicated by arrow A in FIG. 1, it will raise the camera's rewind release button 20 by means of the connecting rod 18 and member 19 to permit the film rewinding operation to occur, whereafter the projection 23 will rotate the lever 21 to release the engagement between the end 35 of this lever and the ratchet wheel 33, thus allowing the ratchet wheel 33, printed plate 37 and scale plate 38 to be rotated by the spiral spring 36 until the mark "S" on the scale plate 38 returns to its initial position. Thereupon, the switch S4 is closed. Then, when the lever 39 is rotated in the direction indicated by arrow B, the rewind shaft 44, integral with the member 41, will be moved upwardly (i.e., in the direction of arrow C) by means of the member 40, and the conductor 121, which has been engaged with the conductor 120 will be disengaged therefrom and connected with the conductor 122 to open the switch S1 and close the switch S2, the switch S5 having been closed due to deenergization of the magnet 27, thus forming a reverse rotation circuit which is composed of the electric source E, switches S4 and S2, motor 1 and switch S5 (FIG. 2). The motor thus starts to revolve in the direction opposite to that during the film winding operation, thereby rotating the gears 48, 49, worm 50 and worm wheel 46. As the rewind shaft 44 is further moved up, the pawl 43 of the member 41 is brought into engagement with the pawl 45 of the worm wheel 46 so that the rotation of the worm wheel 46 is transmitted to the rewind shaft 44. Thereupon, the coupling 47, attached to the upper end of the rewind shaft 44, is engaged with the supply spool 202 in the camera to rewind the film. During the reverse rotation of the motor, the torque thereof is transmitted to the wind-up portion of the camera as well, but not to the camera's wind shaft 15 because such transmission is interrupted by the pawl clutch comprising pawl 9 and ratchet wheel 54.

There are two types of film magazine, i.e., one having projections formed in the lower portion of the magazine spool and one having no such projection. For these two different types of film magazine, FIGS. 5 and 6 respectively show the manner in which the coupling 47 is engaged with the film magazine in the camera. In FIG. 5, which shows a magazine spool 80 having projections 59 formed in the lower portion thereof, the pawls 60 of the rewind coupling 47 engage these projections 59 to transmit the rotation of the rewind shaft 44 to the magazine spool 80. In FIG. 6, which shows a magazine spool 90 having no such projections, members 61, which are pivotally supported on the rewind shaft 44 by stub shafts 63, tend to open outwardly under the force of a compression spring 62, but such tendency is blocked by a fixed member 64 of the camera body when the rewind shaft 44 is in a downwardly retracted position. When the rewind shaft 44 is moved upwardly, the members 61 are allowed to open outwardly by the force of the compression spring 62 to establish a frictional coupling to the magazine spool 90. In the present invention, the rewind shaft may be engaged with the magazine spool by means of a coupling as shown in either FIG. 5 or 6.

The circuitry of the present invention is shown in FIG. 2 from which it will be seen that one side of the motor 1 may be connected to one side of a power source E through switch S, and to the other side through switches S6 and S3; and the circuit may be arranged to reverse its direction by switches S5 on one side and S2 and S4 on the other. Switch S7 and solenoid 27 are serially connected and are in parallel with the motor. Thus, switches S4 and S2 are serially connected for connecting the motor 1 with the electric source E during the rewind operation so that the switch S4 may be opened and closed by the printed plate 37 securely mounted on the common shaft with the ratchet wheel 33 of the film counter. The switch S4 is closed only when the mark "S" on the scale plate 38 is registered with the index mark, but is open in any other position of the scale plate 38. In the closed position of the switch S4, the lever 39 is rotated in the direction of arrow B to raise the member 41 by means of the member 40, whereby the member 41 closes the switch S2 to nergize the motor 1. Therefore, even if the lever 39 is inadvertently actuated during the picture-taking process, no rewind will take place, and thus no failure will arise in the picture-taking.

I believe that the construction and operation of my novel motor drive for a camera will now be understood, and that its advantages will be fully appreciated by those persons skilled in the art.

I claim:

1. A motor-driven film rewind device for a camera comprising
   a motor (1);
   a circuit including first and second switches ($S_4$, $S_1$) connected in series with each other for driving said motor when both of said first and second switches are closed;
   first manually operable means (17, 18, 23) movable between first and second positions, said first switch ($S_4$) being associated with said first means to be closed when said first means is in second position;
   means (200) for preventing transportation of a film in a rewinding direction when said first means is in said first position and for permitting film transportation when said first means is in said second position; and
   second manually operable means (44, 47, 49, 50) engageable with a film supply spool (202) and connected to said motor for transmitting drive of said motor to said supply spool to rewind the film on said supply spool, said second means being movable between a first position in which it is disengaged from said supply spool and a second position in which it is engaged with said supply spool, said second switch being associated with said second means to be opened when said second means is in said first position and to be closed when said second means is in said second position;
   whereby when said first means and said second means are positioned in their respective second positions, said first and second switches are closed to rewind the film on said supply spool by the rotation of said motor.

2. A motor-driven film rewind device according to claim 1, wherein said second manually operable means comprises:
   a rotary shaft having at one end thereof coupling means engageable with said supply spool, said coupling means being engaged with said supply spool in the second position of said rotary shaft thereby to transmit the rotation of said rotary shaft to said supply spool;
   a manually operable lever connected to said rotary shaft to move the latter between first and second positions; and
   clutch means provided between said rotary shaft and said motor, said clutch means being adapted to connect said motor and said rotary shaft together only when said rotary shaft has been moved to its second position by said lever.

3. A motor-driven film rewind device according to claim 1, wherein said film transportation preventing means includes a sprocket.

4. A motor control mechanism for a camera in which the film winding and rewinding operations are effected by a drive motor, comprising:
- a reversible motor (1);
- a film rewinding circuit including first ($S_4$), second ($S_2$) and third ($S_5$) switches connected in series with each other for driving said motor in the film rewinding direction when said first, second and third switches are closed;
- a film winding circuit including fourth ($S_3$), fifth ($S_6$) and sixth ($S_1$) switches connected in series with each other for driving said motor in the film winding direction opposite to the film rewinding direction when said fourth, fifth and sixth switches are closed;
- film counter mechanism (33, 38, 32b) movable, in response to transportation of film in the winding direction, from an initial position in which no film loaded in the camera is wound, to a terminal position, in which the loaded film is completely wound, for indicating the number of the wound film frames, said counter mechanism actuating said first and said fourth switches so that said first and said fourth switches are closed when said mechanism is in said initial position, only said first switch being opened when said mechanism is moved from said initial position and said fourth switch being opened when said mechanism is in said terminal position;
- means for selectively preventing transportation of a film in the rewinding direction and permitting said film transportation;
- first manually operable means (17, 18, 23) associated with said selectively preventing means and said counter mechanism, said first manually operable means being movable between a first position, in which said selectively preventing means prevents said film transportation in the rewinding direction, and a second position in which said selectively preventing means permits said film transportation in the rewinding direction and said counter mechanism is returned to said initial position;
- second manually operable means (39, 44, 47, 46, 50) engageable with a film supply spool in the camera and connected to said motor for transmitting drive of said motor in the film rewinding direction to said supply spool to thereby rewind the film on said supply spool, said second manually operable means controlling said second and sixth switches and being movable between a first position, in which said second means is disengaged from said supply spool and said second switch is opened and said sixth switch is closed, and a second position in which said second means is engaged with said supply spool and said second switch is closed and said sixth switch is opened; and
- means ($S_7$, 27) for selectively closing either said third switch or said fifth switch, whereby, when said first and said second means are in said first positions, respectively, and said selectively closing means closes said fifth switch, the film winding operation is effected, and when said counter mechanism reaches said terminal position the film winding operation is stopped, and when said first and said second means are in said second positions, respectively, and said selectively closing means closes said third switch, the film rewinding operation is effected.

5. A motor control mechanism according to claim 4, wherein said selectively closing means includes a solenoid (27), said solenoid being associated with said third and said fifth switches so that during energization of said solenoid said third witch is opened and said fifth switch is closed, and that during deenergization is said solenoid said third switch is closed and said fifth switch is opened.

6. A motor control mechanism according to claim 5, wherein said selectively closing means further includes a seventh switch ($S_7$), said solenoid being connected to said seventh switch and said fourth switch so that said solenoid is energized when said seventh and said fourth switches are closed.

7. A motor control mechanism according to claim 4, wherein said second manually operable means comprises:
- a rotary shaft having at one end thereof coupling means engageable with said supply spool, said coupling means being engaged with said supply spool in the second position of said rotary shaft thereby to transmit the rotation of said rotary shaft to said supply spool;
- a manually operable lever connected to said rotary shaft to move the latter between first and second positions; and
- clutch means provided between said rotary shaft and said motor, said clutch means being adapted to connect said motor and said rotary shaft together only when said rotary shaft has been moved to its second position by said lever.

* * * * *

UNITED STATES PATENT OFFICE
CERTIFICATE OF CORRECTION

Patent No. 3,783,762                     Dated January 8, 1974

Inventor(s) SHIRO SUGIMORI

It is certified that error appears in the above-identified patent and that said Letters Patent are hereby corrected as shown below:

Front page, below "[21] Appl. No.: 271,628", insert

-- [30]        Foreign Application Priority Data

August 9, 1971   Japan ............... 46/60073 --

Column 1, line 50, change "supply tool" to -- supply spool --.
Column 2, line 22, change "FIG." to -- FIGS. --.
Column 4, line 9, change "Fruther" to -- Further --.
Column 6, line 4, change "nergize" to -- energize --;
         line 16, change "($S_4, S_1$)  to -- ($S_4, S_2$) --.

Signed and sealed this 11th day of June 1974.

(SEAL)
Attest:

EDWARD M. FLETCHER, JR.                C. MARSHALL DANN
Attesting Officer                      Commissioner of Patents